June 3, 1952 C. E. NEWKIRK 2,599,065
WHEELED DISK HARROW
Filed March 13, 1945 3 Sheets-Sheet 1

INVENTOR.
CLARENCE E. NEWKIRK
BY Carlos G. Stratton
ATTORNEY

June 3, 1952  C. E. NEWKIRK  2,599,065
WHEELED DISK HARROW
Filed March 13, 1945  3 Sheets-Sheet 2
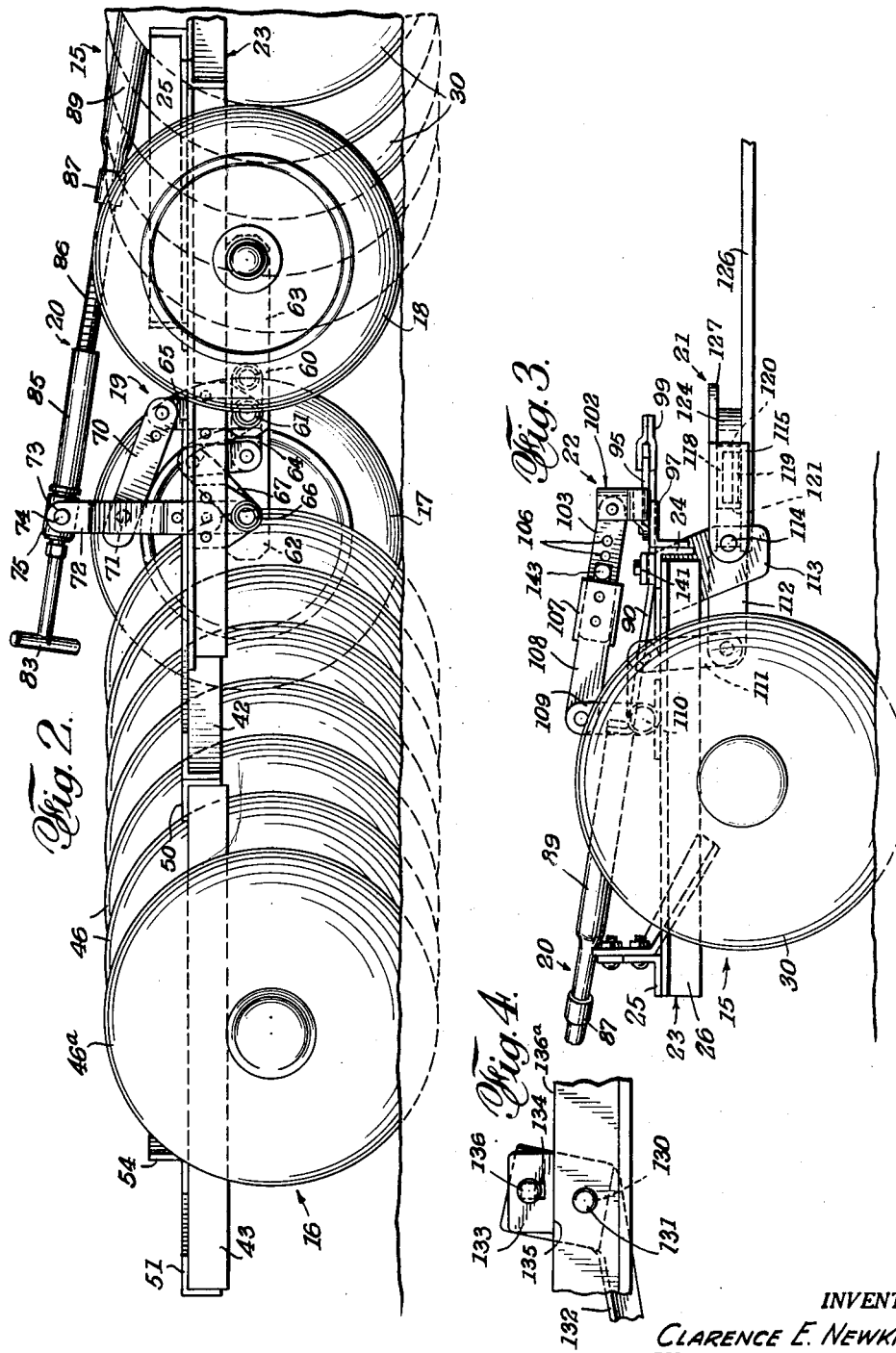
INVENTOR.
CLARENCE E. NEWKIRK
BY
Carlos G. Stratton
ATTORNEY

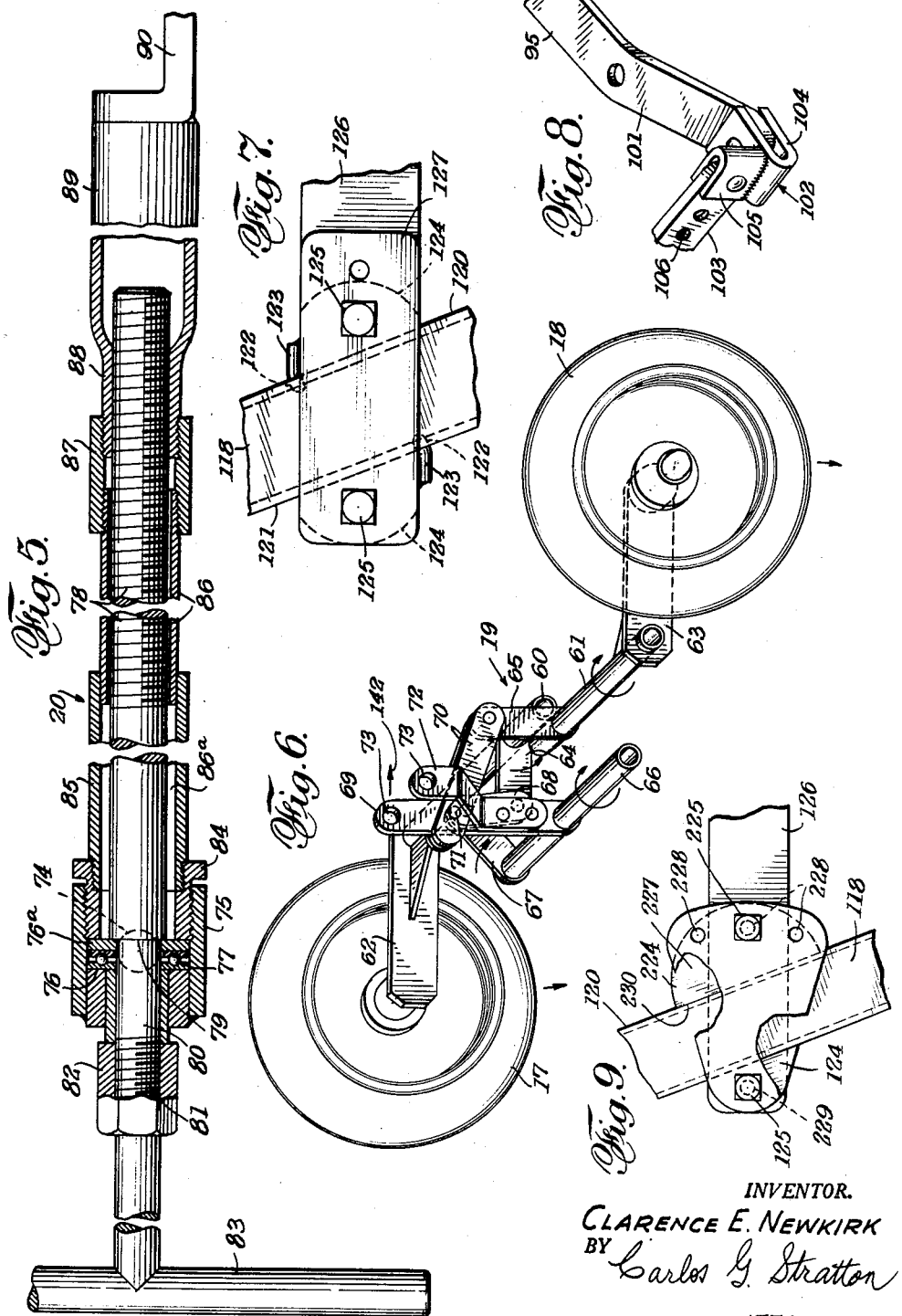

Patented June 3, 1952

2,599,065

UNITED STATES PATENT OFFICE 2,599,065

WHEELED DISK HARROW

Clarence E. Newkirk, Lynwood, Calif.

Application March 13, 1945, Serial No. 582,533

11 Claims. (Cl. 55—73)

This invention relates to agricultural machines of the cultivating type and relates more particularly to disc harrows.

The primary object of this invention is to provide a disc harrow having two gangs of discs and provided with novel means for raising and lowering said discs with respect to the ground to obtain: (1) desired harrowing depth when cultivating; (2) full clearance of the discs with a road surface when being transported from place to place; (3) proper balance of the disc gangs to effect the above; (4) adjustability for obtaining desired harrowing relationship between the discs of the front and the rear gangs; etc. This invention is an improvement of my Patent No. 2,356,876, dated August 29, 1944.

Another object of the invention is to provide novel means arranged in a novel manner for the running wheels of a disc harrow, whereby the disc gangs may function in a suitable manner when cultivating and when the harrow is being transported along a road or the like.

Another object of the invention is to provide means affording both manual and automatic relational positioning of the disc wheels of a harrow both when cultivating and when moving along a road or like surface.

Another object of this invention is to provide simple, sturdy and effective mechanical linkage for controlling the movement of tracking wheels of a disc harrow for desired disposition of the harrowing discs thereof with respect to the ground.

A further object of this invention is to provide a disc harrow of the type indicated in which means are provided for adjusting the position of one gang of discs with relation to the other gang and to the tracking wheels of the harrow.

A further object of the invention is to provide means in a harrow for obtaining angular adjustment of one of the gangs of discs thereof with respect to the other gang in accordance with desired soil looseness when harrowing.

A still further object of the invention is to provide a harrow having a novel draw bar construction and arrangement.

A still further object of the invention is to provide a harrow having tracking wheels and control mechanism for said wheels whereby one wheel will move at a faster rate than the other wheel for the purpose of raising the gangs of harrow discs in such a manner as to facilitate turning the harrow while cultivating.

A still further object of this invention is to provide novel means for effecting manual adjustment of the position of the tracking wheels of a harrow and, consequently, desired cultivating depth of the discs of said harrow.

A yet further object of the invention is to provide novel means affording suitable relational positioning of a scraper to a harrowing disc.

The invention is further characterized by the novel design and arrangement of the details and components thereof.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 2 is a partial side view thereof as seen in direction of arrow 2 of Fig. 1, and illustrated at a somewhat larger scale.

Fig. 3 is a similar view as seen in the direction of the arrow 3 of Fig. 1.

Fig. 4 is a fragmentary side view showing disc scraper mounting means according to this invention.

Fig. 5 is a broken, enlarged partial sectional and partial elevational view of a preferred embodiment of manually adjustable means for effecting relative movement of the tracking wheels and the harrow gangs.

Fig. 6 is a perspective view of the tracking wheels and the control linkage therefor.

Fig. 7 is a fragmentary plan view of means for mounting a hitch to the harrow herein.

Fig. 8 is a fragmentary perspective view of a detail of the invention.

Fig. 9 is a view similar to Fig. 7, showing an alternate connecting means for the hitch bar.

Figure 1:
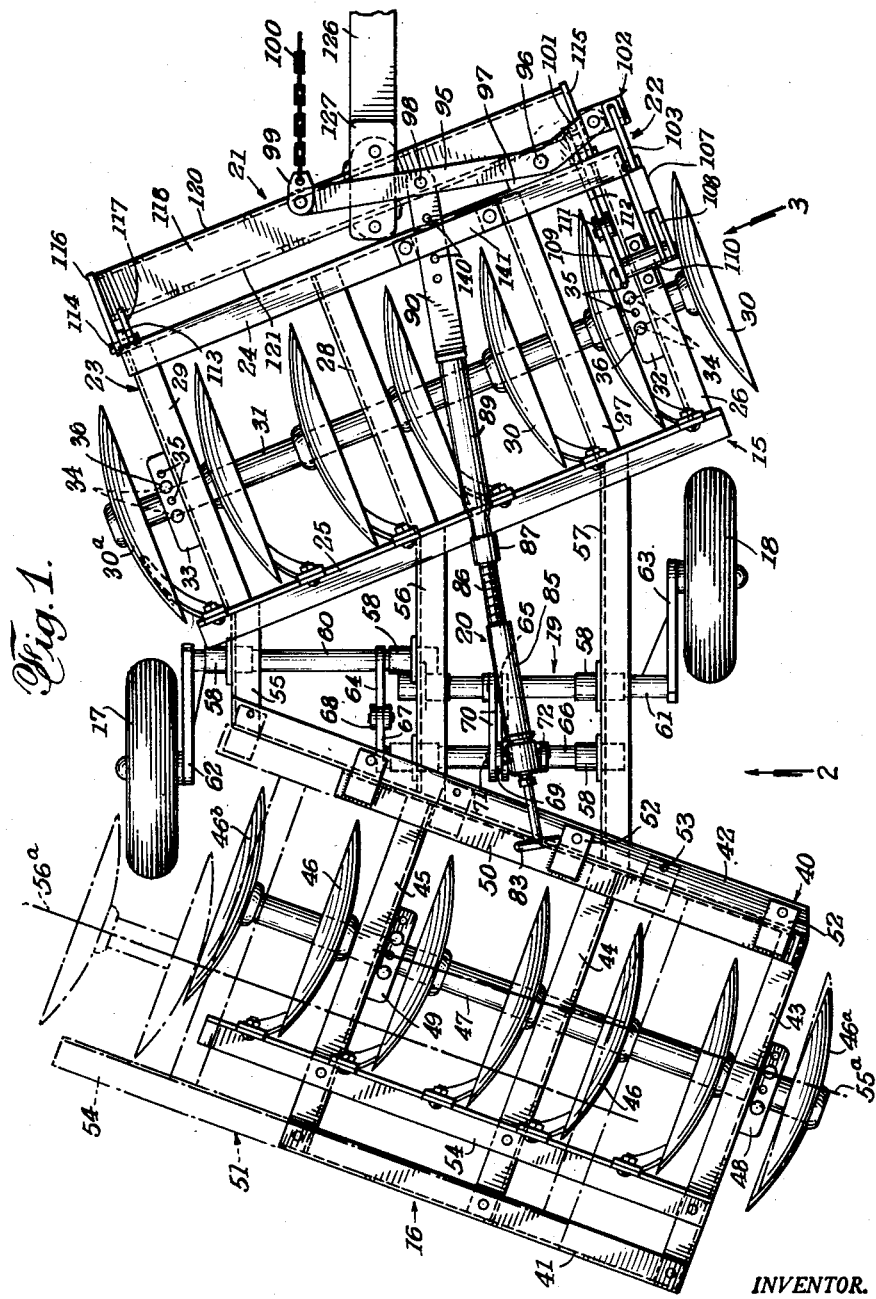
Fig. 1 is a plan view of a disc harrow incorporating features of the invention.

The present embodiment of the invention may be said to comprise a front gang 15, an auxiliary or adjustable gang 16, tracking wheels 17 and 18, operating mechanism 19 therefor, manual adjustment means 20, draw bar means 21, means 22 as controlled by a pulling vehicle for effecting automatic adjustable movements of the harrow, and such other details, elements and devices as are hereinafter described.

The front gang 15 of the harrow, may comprise a main frame 23, said frame preferably comprising transverse members 24 and 25 and a plurality of longitudinal members 26, 27, 28 and 29. The members 24 to 29, inclusive, may be of suitable metal and of light strong cross section, and, for this purpose, may be structural angles as shown. The frame 23 may serve to carry a plurality of harrow discs 30 between the transverse members 24 and 25. Said discs are substantially uniformly spaced and mounted rigidly on a tube 31 or the like for free rotation in journal bearings which may be carried on brackets 32 and 33 fixed on the respective members 26 and 29. The center of the tube and, consequently, the center of rotation of the harrow discs, is preferably below the frame 23 as shown best in Fig. 3. Means are provided affording adjustment of the gang of discs both laterally and angularly with respect to the frame 23. For this purpose, the brackets 32 and 33 are each preferably provided with plural pairs of mounting holes 34 and 35 for selective engagement with bolts 36 whereby the journal bearings of the tube 31 may be secured to the brackets 32 and 33 by passing said bolts either through holes 34 or 35. By mounting one journal bearing in the holes 34 of bracket 33 and the other in the holes 35 of bracket 32, the disc tube 31 may be disposed at an angle to the frame 23 and the discs presented for earth turning operation at a greater angle to the path of movement of the harrow. The presentation angle of the discs may be lessened by mounting the journals in the holes 35 of bracket 33 and holes 34 of bracket 32.

The adjustable gang 16 may comprise a frame 40 which may comprise transverse members 41 and 42 and a plurality of longitudinal members 43, 44 and 45. The structural members of the gang 40 may be similar to those of the gang 23. The frame 40 may serve to carry a plurality of harrow discs 46. These discs are also rigidly carried as on a tube 47 which is mounted for free rotation in journal bearings which may be carried as on brackets 48 and 49 fixed on the respective longitudinal frame members 43 and 45. The center of this tube and, consequently, the center of the discs 46 are also preferably below the frame 40 as seen in Fig. 2. The means for providing adjustment of the gang of discs both laterally and angularly with respect to the frame 40 may be similar to that described for the front gang of discs.

From Fig. 1 it will be seen that the discs of the gangs 15 and 16 are arranged in staggered relation with one end disc 30a of gang 15 and one end disc 46a of gang 16 being the outer lateral discs of the harrow. It may be desired to arrange the end disc 46b as the outer lateral disc. This may be accomplished by providing for adjustment laterally, of the gang 16. To this end, the frame 40 may include a third longitudinal member 50 to which the transverse members 43, 44 and 45 are fixed, said member 50 being adapted to have a position with respect to the member 42 as shown by the dot-dash lines of Fig. 1. The members 41, 43, 44, 45 and 50 may thus comprise a separate adjustable frame 51. The frame 51 may have affixed thereto, as by welding, a plurality of lugs 52 which may have holes for selective mounting engagement with holes 53 provided in the longitudinal member 42. The members 42 and 50, being preferably angle members, additional aligned holes in the legs of these members may, also be provided for securing bolts or the like.

When it is desired to move the frame 51 from its full line position to its dot-dash line position, clearance over the wheel 17 is afforded by moving the brackets 48 and 49 nearer to the transverse member 41. For this purpose, also, the angle member 54 may be moved from its position between the members 41 and 50 to overstand and rest upon the member 41. As shown in Fig. 1 in addition to the full line position of the disc centers, they may be selectively arranged on the center lines 55a and 56a in accordance with desired results.

The two frames 23 and 40 may be rigidly connected as by members 55, 56 and 57 which connect to the members 25 and 42. The frames 23 and 40 are thus arranged to form a V which, while shown inverted may be right side up as can be understood.

The operating mechanism 19 for the tracking wheels 17 and 18 may be carried by the members 55, 56 and 57. For this purpose shafts 60 and 61 are preferably provided, said shafts being carried by the aforementioned members as in bearings 58. The wheel 17 may be carried for free rotation on the end of an arm 62 fixed on the shaft 60, and, similarly, the wheel 18 may be carried by an arm 63 on the shaft 61. The arms 62 and 63 are preferably arranged in opposite directions as shown. The shaft 60 may be provided with an arm 64 and the shaft 61, with an arm 65.

The wheels 17 and 18 may be moved with respect to each other and with respect to the frame of the harrow. For this purpose a control shaft 66 may carry an arm 67 which, through the medium of links 68 connects with the arm 64 on the shaft 60. Another arm 69 on the shaft 66 may be connected to the arm 65 on the shaft 61 as by links 70. The arms 64 and 67 are substantially similar in length and, therefore, rotational movement of the control shaft 66 will cause a like rotation of the shaft 60. However, the point 71 on the arm 69 is a greater distance from the shaft 66 than is the link end of the arm 65 from its shaft 61. Hence, the angular movement of the arm 65 will be greater than that of the arm 69, and consequently, the wheel 18 will move faster than the wheel 17 when the arm 69 is moved around the axis of the control shaft 66.

The manually adjustable means 20 may comprise an adjustable screw assembly which is preferably carried by the arm 69 and between said arm and a bracket 72 secured thereon. The arm 69 and bracket 72 may be provided with bearing holes 73 for trunnions 74 on opposite sides of a block 75, said block being provided with a shoulder 76 for a thrust bearing 77. A screw stem 78 having a shoulder 79 engaged with a thrust washer 76a bearing on the thrust bearing, may pass axially through the block 75. The reduced part 80 of the screw stem, extending through the block, may be threaded as at 81 for connection with the nut end 82 of a manual handle 83. The end of the block 75 opposite to the handle 83 may have threaded therein a nipple 84 which serves to hold the thrust bearing 76 and thrust washer 76a in assembly. Said nipple may carry a sleeve 85, said sleeve being spaced from the screw stem 78 to form an annular space 86a into which one end of an inner sleeve 86 may move. The other end of said inner sleeve 86 may be threadedly connected to a coupling 87 which may be similarly connected to the reduced internally threaded end 88 of a tube or pipe 89. The assembly 20 is completed by providing a bar 90 as by welding it on the end of the tube 89.

It may be seen that upon rotation of the handle 83, the stem 78, through the medium of its threaded connection with the tube 89, will cause longitudinal movement of said tube with respect to the block 75, the sleeve 86 moving into the annular space 86a. The nut 82 will take the thrust in one direction and the stem shoulder 79 in the other. It will also be seen that bodily movement of the block 75 is effected by an endwise push or pull on the bar 90, to cause movement of the arm 69 and thus partial rotation of the control shaft 66. The above described assembly may be kept in good operating condition since lubricant such as grease may be introduced into the various sleeves and tubes to minimize wear of the parts and to afford freedom of movement among the parts.

The means 22 which may be connected to a vehicle towing the harrow, may comprise a lever 95, pivoted as at 96 on an angle bracket 97 carried as by the frame member 24. Said lever may be pivotally connected as at 98 to the bar 90 above mentioned. The lever 95 as by a clip 99 may be connected to a chain 100 which may be secured to parts of said towing vehicle. The lever 95 may, on an arm 101 thereof, carry a universal pivot means 102, and through said means, may be connected to a link 103 arranged transversely to the lever 95. Through the medium of the connection means 102, the lever 95 may move in a horizontal plane around its pivot 96 and the link 103 may move in a vertical plane transversely thereto. The means 102 may be simply made of a horizontal U-shaped part 104 and a vertical similar part 105 welded in a face of the part 104. This arrangement can best be seen in Fig. 8.

The link 103 may be provided with a plurality of holes 106 and is adapted to move within the hollow part 107 of a link 108 which may be mounted on one arm of a bell crank lever 109 which may be pivoted as at 110 on the frame 23. The other arm of said bell crank lever, through the medium of links 111, may be connected to an arm 112 carried by the draw bar 21.

The draw bar is preferably mounted for pivotal movement as on brackets 113 carried by the frame 23, said brackets carrying pivot pins 114 for side arm bars 115, 116, 117 and the mentioned arm 112. Between the arm bars 115 and 116, which are on opposite ends of the frame 23, the draw bar may be fixed or carried as shown. A preferred structure of draw bar comprises an inverted channel 118 with a plate 119 welded therein to form a box which is light yet sturdy and inflexible for the purpose.

A hitch may be provided. For this purpose the front wall 120 and the rear wall 121 of the channel 118 may be provided with suitably spaced holes 122 for selective engagement with pins 123 carried by block 124, which, by means of bolts 125 may be locked into place on either side of the channel 118 and in contact with the channel faces 120 and 121. Said bolts 125 may pass through aligned holes in a hitch bar 126 and a plate 127 on the respective lower and upper surfaces of the draw bar.

The modification shown in Fig. 9 contemplates the omission of the pins 123 and the holes 122 of the previously described form. Accordingly, the bar 126 may be affixed at any point along the length of the draw bar 118. One block 124 of the previous form is retained but without the pin 123. The plate 127 is replaced by a sector-shaped plate 227 which has a plurality of holes 228 arranged in an arc which centers on the hole 229. The other block 124 is replaced by a relatively larger semi-circular spacer plate 224, the chordal edge 230 of which abuts the edge 120 of the draw bar 118. In this construction, the bolt 125 is mounted as before, and the desired angle between the draw bar 118 and the hitch bar 126 is selectively attained by placing the bolt 225 into one of the respective holes 228 of the sector plate 227, into an aligned hole provided in the spacer plate 224, and through a hole in the hitch bar 126.

When the bolts 125 and 225 are pulled up tightly, the straight side of the block 124 bears on the edge 121 of the draw bar and the chordal edge 230 of the spacer 224, bears on the other edge 120 of said draw bar to clamp the latter firmly and effectively. Such clamping engagement may be effected at any point along the length of said draw bar and at the three angular positions provided for by the three holes 228.

The discs 30 and 46 may be provided with means for cleaning out accumulations of earth. Accordingly, the member 25 of the frame 23 and the member 54 of the frame 40, may each be formed with suitable holes 130 for bolts 131 which mount scrapers 132 associated with each harrow disc. Suitable adjustment of the scrapers is provided for by the provision of a block 133 for each scraper. Each block may have an elongated hole 134 and an edge 135 adapted to engage the top edge 136 of the member 25 or the member 54, as the case may be. A bolt 136, passing through each hole 134 and engaged with the scraper may serve to lock each scraper in suitable angular position for desired relation to each respective disc. By sliding the block 133 along the top edge 136a, tilting the scraper accordingly, and blocking up the bolts 131 and 136, each scraper may be individually adjusted.

By means of the above structure, with the wheels disposed as in Fig. 2, a vehicle towing the harrow as by the hitch bar 126 will function to turn the soil engaged by the discs 30 in one direction, and to turn the soil by the discs 46, in the other direction. Should a deeper penetration of the discs be desired, the handle 83 may be turned to provide for elongation of the means 20 and, consequently, raising of the wheels 17 and 18 with respect to the discs to allow said discs to penetrate the soil to a greater depth. Reverse adjustment of the handle 83 will cause the wheels to be lowered with respect to the discs so that their soil penetration will be less.

During normal operation, the link 103 reciprocates telescopically in the hollow of the link 108 in accordance with inequalities in the soil as the harrowing proceeds. When the harrow is to be moved as along a road, a pin or bolt may be inserted in one of the holes 140 after a pull has been exerted on the lever 95 by pulling on the chain 100 by a hitch connection on the towing vehicle or tractor. This pull, which is exerted on the abutment bar 141 carried by the frame 23, tilts the lever 69 in the direction of the arrow 142 to move the wheels 17 and 18 downwardly with respect to the harrow discs and cause bodily raising of the harrow frame, and, consequently, the discs 30 and 46. In this condition, a bolt 143 may also be inserted in one of the holes 106 of link 103 for abutment with the end of the link 108. This causes a tilting of the draw bar assembly and further assists the desired elevating of the harrow discs.

During normal operation, the discs may be raised out of the soil from a position on the tractor by a mere pull on the chain. Such a condition may arise when turning or to pass over soil which is not to be turned. Such a pull will cause bodily movement of the means 20 and, therefore, rotation of the control shaft in a direction to cause moving of the wheels 17 and 18 downwardly.

Both wheels 17 and 18 may run on loose earth, that is, earth which has been harrowed. The harrow may be arranged to have the wheel 17 run in a furrow, if desired.

It will be noted that, because the wheel arms 62 and 63 are oppositely directed, a relatively large base is provided affording suitable balance to the harrow and that all necessary controls may be effected from a position on the tractor after suitable adjustment of harrowing depth has been made.

When harrowing a field with the harrow herein described, the towing tractor pulls uniformly on the hitch bar 126 and, through chain 100, on lever 95. Consequently, said lever has no movement relative to frame 23. At the end of a furrow, should the tractor be steered to the left in a complete U-turn to cultivate a furrow parallel to the one just completed, the harrow discs, because of the angular arrangement of both gangs thereof, will track normally in a curve to the left. It is, therefore, unnecessary to raise the discs out of the ground when turning left to start a new furrow.

However, should the tractor turn to the right, the discs will not track properly. It is, therefore, necessary to raise the discs out of engagement with the ground in order to make a right turn. The present mechanism, as above set forth, provides for said discs automatically lifting during a right turn and then automatically lowering to harrowing position upon a straightening realignment of the tractor and harrow. This automatic raising and lowering of the discs is accomplished as follows:

Upon a right turn of the tractor, the left side thereof describes a greater arc than the right side. As seen in Fig. 1, chain 100 is directed for connection to the tractor to the left of hitch bar 126, as viewed in the direction of the tractor from the harrow. Consequently, lever 95 will be pulled forward on its pivot 96 relative to frame 23. This results in a pull on bar 90, and, through trunnions 74, a pull on arm 69. Said arm, through links 70, rocks arm 65 and its shaft 61 in a clockwise direction (Fig. 6) and said latter shaft, through arm 63, moves wheel 18 in a downward direction. The wheel 17 is simultaneously moved in a downward direction through rocking of shaft 66 by arm 69, arm 67 on said shaft, link 68, arm 64, shaft 60 and arm 62 on the latter shaft and mounting wheel 17.

From the foregoing it will be seen that, upon a right turn of the towing tractor, the resultant pull on lever 95, will cause an automatic lowering of wheels 17 and 18 and, through engagement with the ground by the wheels, a resultant raising of the harrow frames and the discs carried thereby.

During the foregoing automatic action, one frame may overbalance the other and one of the gangs of discs may still be in engagement with the ground. However, by providing a relatively fixed point, the pivot 114, with relation to which, frame 23 raises, the entire harrow frame raises uniformly on the wheels. Said pivot 114 with respect to a horizontal plane, is fixed to draw bar means 21, and the latter to the hitch bar 126. By connecting the latter bar to the tractor to have limited tilting movement, the pivot 114 is held against substantial vertical movement.

When lever 95 is pulled upon a right turn of the tractor, its arm 101 pushes on means 22. A push is thus exerted by bolt 143 on the end of link 108 resulting in bellcrank 109 rocking on its pivot 110. This results in an upward pull on links 111 and arm 112 connected therewith and mounted on pivot 114. Consequently, the normal approximate 90° angle between links 111 and arm 112 increases and this straightening of said angle, results in the center 110 of the bellcrank lifting together with pivot 114. This pivot being carried by frame 23, the latter raises upwardly, and creates a relative angle between bar 126 and frame 23 at their pivotal connection 114. The hitch bar, being capable of limited vertical tilting, the same tilts while the frame 23 remains substantially horizontal. The harrow frame being substantially rigid, the same is supported in raised level position on wheels 17 and 18.

Of course, as the tractor straightens out its turn, the wheels automatically raise, the frame lowers, and the harrow discs resume their harrowing engagement with the ground.

This mode of operation of the harrow, and also when the same is being towed along a paved road, entails a suspension of the entire harrow frame on wheels 17 and 18. Thus, a considerable bending moment is imparted to the frame angle members 26, 27, 28, 29, 43, 44, 45, 55, 56 and 57. The heretofore conventional way of applying these angle members was to place one leg flat upon the longitudinal members of the frame and have the other leg upwardly directed. It will be evident that, particularly the latter legs of members 55, 56 and 57 were subjected to stretch, being in tension, while the other legs were in compression. In the present harrow frame, the mentioned angle members are applied beneath the longitudinal members with one leg flat, as before, and the other downwardly directed. Thus, the latter leg of each angle, when the frame is supported on the wheels, is in compression, thereby counteracting springing of the frame and holding the same rigid throughout.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. An agricultural machine of the character described comprising, front and rear disc gangs, a frame connecting said disc gangs, a pair of wheels supporting said frame, a pair of shafts carried by said frame and extending to opposite sides of said frame, an arm connecting each shaft and its respective wheel, said arms being oppositely disposed, a control shaft, means connecting said control shaft with said pair of shafts for operating said shafts and the wheels connected to the arms thereof simultaneously atdifferent speeds and means to operate said control shaft.

2. In an agricultural machine having front and rear gangs of discs, means for supporting said gangs, said means comprising a pair of shafts disposed between the gangs, and a wheel carried by each shaft in relative offset relation thereto, a control shaft, means for effecting partial rotation of said control shaft, arms on the control shaft and the aforementioned wheel shafts, and links connecting the arms of the respective shafts, said links being connected to said arms at different distances from the respective shafts whereby the centers of said wheels will move simultaneously at different speeds upon rotation of said control shaft.

3. In an agricultural machine, a frame, discs carried by the frame, support wheels for the frame, a pair of shafts on said frame, each having an arm on the ends of which said wheels are mounted, a control shaft on said frame, pivotal connections between said control shaft and said pair of shafts, an arm on said control shaft, and adjustable linkage connected with said arm and manually operable rotationally to move said arm relatively thereto to regulate the engagement of the discs with the ground, said adjustable linkage being bodily movable longitudinally to disengage the discs completely from the ground.

4. In an agricultural machine, a frame, discs carried by the frame, support wheels, a pair of shafts mounted on said frame and provided with oppositely disposed arms on the ends of which said wheels are mounted, a control shaft having an operating arm, means on said last named shaft connecting with said pair of shafts for operating same and said wheels bodily to regulate the engagement of the discs with the ground, screw means carried by said arm and abutting said frame to move said arm and varyingly regulate the engagement of said discs with the ground, a crank for operating said screw means, and means for moving said screw means longitudinally to effect complete disengagement of the discs from the ground.

5. In an agricultural machine, a frame, discs carried by the frame, support wheels, lifting-lowering means on said frame for said wheels including an arm for each wheel, said arms being oppositely disposed, an arm operatively connected with said lifting and lowering means, a block on said arm, a screw stem rotative in said block, and non-rotational means connected with said screw stem and abutting said frame to move said block with the screw stem longitudinally relative to the non-rotational means, said means being operable bodily to move said stem and said arm thereby to effect lifting of the discs from engagement with the ground.

6. In an agricultural machine adapted to be towed, a frame, a pair of wheels supporting said frame and arranged to balance the same, a gang of harrow discs carried by the frame, one on each side of the wheels and balanced thereby, a pair of shafts between the disc gangs and carried by the frame, an arm on each shaft and each mounting one of said pair of wheels on its free end, said arms being oppositely directed, one toward one gang of discs and the other toward the other gang, a control shaft parallel to said pair of shafts and also carried by the frame, linkage including an arm connecting the three shafts, manually operable screw means connected with said latter arm to adjust the pair of shafts and the wheels relative to the disc gangs and frame, and means connected to the screw means and the vehicle towing said machine for longitudinally and bodily moving said screw means to effect the mentioned wheel adjustment.

7. In an agricultural machine adapted to be towed along the ground, at least one gang of cultivating discs arranged at an angle to the normal direction of straight line movement of the machine, a frame mounting said gang of discs, a hitch connecting the frame and the towing device and mounted on the frame to have limited tilting movement, a member carried by the frame and connected to the towing device to move relative to the frame only when said towing device turns in a direction opposed to the direction in which the angularly arranged gang of discs will track in the ground, a pair of wheels carried by the frame, and means connecting the wheels and said member for holding the former elevated off the ground when the discs are in ground cultivating position, said means being moved by said member to lower the wheels into engagement with the ground upon turning of the towing device in the aforementioned direction, whereby the frame and the gang of disks are elevated with respect to the ground.

8. In an agricultural machine adapted to be towed along the ground, at least one gang of cultivating discs arranged at an angle to the normal direction of straight line movement of the machine, a frame mounting said gang of discs, a hitch connecting the frame and the towing device and mounted on the frame to have limited tilting movement, a member carried by the frame and connected to the towing device to move relative to the frame only when said towing device turns in a direction opposed to the direction in which the angularly arranged gang of discs will track in the ground, a pair of wheels carried by the frame, means connecting the wheels and said member for holding the former elevated off the ground when the discs are in ground cultivating position, said means being moved by said member to lower the wheels into engagement with the ground upon turning of the towing device in the aforementioned direction, whereby the frame and the gang of discs are elevated with respect to the ground, a fixed pivot on said frame for the hitch, and means interconnecting said pivot and the mentioned member and having an intermediate fixed connection with the frame for tilting said hitch with respect to the frame as the latter raises, whereby the frame is adapted to assume a substantially level position on its wheels.

9. In a harrow, adapted to be towed, a framework, a series of discs mounted on the framework, axles on the framework, crank arms on two of the axles respectively, ground wheels on said crank arms mounted to be raised and lowered relative to the discs to regulate the depth of the discs in the ground and their distance above the ground, a lever pivotally mounted on the framework to actuate the wheels, a crank arm on a third axle on the framework, link means connected with the last-mentioned crank and with the lever linkage between the last-mentioned axle and the other two axles arranged to rotate the latter axles in opposite directions by rotation of the third axle in a given direction, and means connecting with the lever to operate same from tow means for the harrow.

10. In an agricultural machine adapted to be towed, a frame, a pair of wheels supporting said frame and arranged to balance the same, a gang of harrow discs carried by the frame, one on each side of the wheels and balanced thereby, a pair of shafts between the disc gangs and carried by the frame, an arm on each shaft and each mounting one of said pair of wheels on its free end, said arms being oppositely directed, one toward one gang of discs and the other toward the other gang, a control shaft parallel to said pair of shafts and also carried by the frame, linkage including an arm connecting the three shafts, manually operable screw means connected with said latter arm to adjust, the pair of shafts and the wheels relative to the disc gangs and frame, and means connected to the screw means and the vehicle towing said machine for longitudinally and bodily moving said screw means to effect the mentioned wheel adjustment, said latter means including an arm pivotally connected to the frame and movable in a horizontal plane, and an articulated member secured to the free end of said arm and connected to said vehicle, said screw being connected to said arm between the pivot and the free end thereof.

11. In a ground-working apparatus, the combination of front and rear disk gangs, a frame connecting said disk gangs, a pair of wheels supporting said frame, a pair of shafts carried by said frame and extending to opposite sides thereof, an arm connecting each shaft and its respective wheels, said arms being oppositely disposed, a control shaft carried by said frame, a second pair of arms, one carried by each of said pair of shafts, a third pair of arms carried on said control shaft, one of said third pair of arms being longer than the other, and a pair of links, each connecting one of said second pair of arms to one of said third pair of arms whereby said wheels are selectively raised or lowered simultaneously at different speeds upon rotation of said control shaft.

CLARENCE E. NEWKIRK.

REFERENCES CITED

The following references are of record in the file of this patent:

UNITED STATES PATENTS

| Number | Name | Date |
|---|---|---|
| Re. 12,336 | Kopperud | Apr. 4, 1905 |
| 377,213 | Ritty | Jan. 31, 1888 |
| 496,119 | Hancock | Apr. 25, 1893 |
| 510,126 | Flynt | Dec. 5, 1893 |
| 876,145 | Buchet | Jan. 7, 1908 |
| 1,011,385 | Smith | Dec. 12, 1911 |
| 1,147,281 | Trissel | July 20, 1915 |
| 1,432,143 | White | Oct. 17, 1922 |
| 1,512,258 | White | Oct. 21, 1924 |
| 1,648,381 | Flatley | Nov. 8, 1927 |
| 1,762,633 | Johnson | June 10, 1930 |
| 1,873,359 | Stuck | Aug. 23, 1932 |
| 2,251,788 | Goble | Aug. 5, 1941 |
| 2,285,550 | Woods | June 9, 1942 |
| 2,349,257 | Evans | May 23, 1944 |
| 2,350,579 | Bingham | June 6, 1944 |
| 2,356,876 | Newkirk | Aug. 29, 1944 |
| 2,494,381 | Evans et al. | Jan. 10, 1950 |

FOREIGN PATENTS

| Number | Country | Date |
|---|---|---|
| 537,754 | Great Britain | of 1941 |